Feb. 18, 1969  F. R. GOLDAMMER  3,428,384

CONTROL APPARATUS FOR POSITIONING MECHANISMS

Filed May 12, 1967

INVENTOR
FREELAND R. GOLDAMMER.
BY
Blair Buckles Cesari & St.Onge
ATTORNEYS

United States Patent Office 3,428,384
Patented Feb. 18, 1969

3,428,384
CONTROL APPARATUS FOR POSITIONING
MECHANISMS
Freeland R. Goldammer, Williamsville, N.Y., assignor to
Sperry Rand Corporation, New York, N.Y.
Filed May 12, 1967, Ser. No. 637,973
U.S. Cl. 312—223                    12 Claims
Int. Cl. B65g 17/16; B42f 17/00

ABSTRACT OF THE DISCLOSURE

The disclosure relates to apparatus for controlling a closed loop conveyer system in mechanized file cabinets to convey a keyboard selected record tray to a retrieval location. Each key is connected to one end of a separate sensing lever whose other end carries a cam follower roller being on a cam having three distinctly different cam surfaces. The cams are relatively angularly oriented according to the positions of their associated record trays relative to the retrieval location and are rotated on a common cam shaft by a reversible motor in synchronism with movement of the conveyer. The depression of a key moves its sensing lever into engagement with a sensing bar, the responsive movement of which effects closure of either one of two switches controlling the reversible motor for selected directional motion of the conveyer and cam shaft. Two of these cam surfaces for the sensing lever roller of the depressed key determine which of the two switches is closed and thus the direction of conveyer movement necessary to bring the key selected tray to the retrieval location in the shortest time and over the shortest route. As the sensing lever roller rides onto the third cam surface, the position of the sensing lever is altered to permit opening of the previously closed switch and conveyor motion terminates with the selected tray at the retrieval location.

Background of the invention

The present invention has specific, but not a limited, application to mechanized file cabinets. Such cabinets are being increasingly employed in offices where large quantities of files, records, etc., are kept on file. The filed material must be maintained in a manner such as to be readily accessible for future reference. Mechanized file cabinets for this purpose are constructed to house a plurality of file carriers which are conveyed by a conveyer network to an access opening in the cabinet for convenient record retrieval. Selection of a particular file carrier for positioning at the access opening is typically achieved by actuation of a specific one of a plurality of keys.

One such mechanized file cabinet is disclosed in Reissue Patent No. 25,919, issued Nov. 30, 1965, to W. G. Anders and assigned to assignee herein. The disclosed selection control circuitry by which conveyer movement is controlled to position any desired one of a plurality of file carriers at the access opening is, although satisfactory in operation, rather complex in design. Each of the selector keys operates to close a separate switch, applying an electrical potential to either a first or second half of a split ring through separate brushes. One half of the split ring is connected to a second split ring while the other split ring half is connected to a third split ring. All three split rings are commonly rotated in synchronism with movement of the conveyer. The second split ring is electrically connected through a brush and additional switches to energize a relay controlling the conveyer motor for driving the conveyer in a 1rst direction. The third split ring is electrically connected through another brush and further switches to another relay controlling energization of the conveyer motor for driving the conveyer in the opposite direction. The over-all operation of this control circuitry is to bring a selected file carrier to the access opening by the shortest possible route and in the shortest possible time.

It is seen that the control circuitry of Reissue Patent No. 25,919 requires a considerable number of switches and brushes, split rings, relays and a considerable amount of electrical wiring. As a consequence, this control circuitry is expensive to manufacture and maintain.

Accordingly, it is an object of the present invention to provide positioning control apparatus particularly useful in mechanized file cabinets and which is relatively inexpensive to manufacture and maintain. Rather than a switch for each position, I employ but two switches, one conditioning a positioning mechanism for movement in a first direction and the other conditioning it for movement in a second direction. A different key is associated with each position in which the positioning mechanism is capable of assuming and is actuated to select its associated mechanism position. A plurality of cams, one associated with each mechanism position, move in synchronism with the positioning mechanism. Each cam has three separate cam surfaces joined in series and is oriented to relate the present position of the positioning mechanism to its associated mechanism position. Two of the three cam surfaces of each cam associated with a mechanism position selected by an actuated key control which one of the two switches is actuated, thereby determining the appropriate direction of movement of the positioning mechanism to the selected position. When the positioning mechanism reaches the selected position, the third cam surface terminates movement of the positioning mechanism by causing deactuation of the previously actuated switch; the positioning mechanism thereby being stopped at the selected position.

Other objects of the invention will in part be obvious and will in part appear hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference numerals refer to like parts throughout the several views of the drawings.

*Detailed description of the preferred embodiments*

Figure 1:
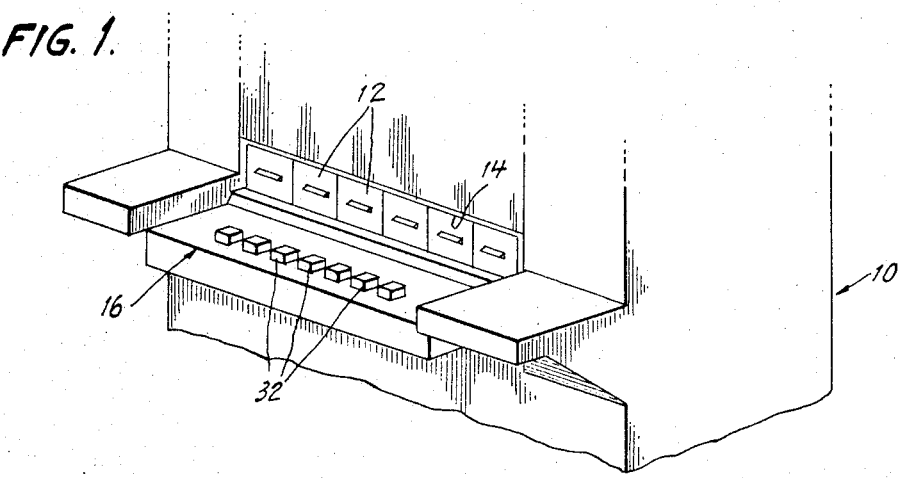
FIGURE 1 is a partial perspective view of a mechanized file cabinet in which the disclosed embodiment of my invention is employed.
Figure 2:
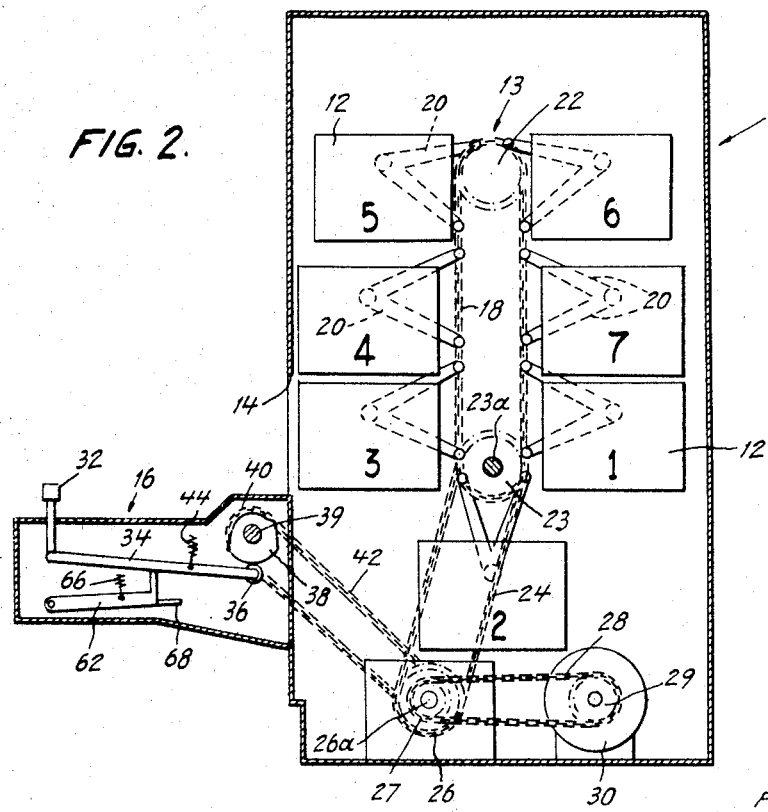
FIGURE 2 is a diagrammatic side elevational view of the file cabinet of FIGURE 1 showing the conveyer network for translating file carriers to a record retrieval location.

Referring now to the drawings and particularly FIGURES 1 and 2, a file cabinet 10 houses a number of record trays 12 which are conveyed by a conveyer, generally indicated at 13, to a record retrieval location at an access opening 14 under the control of a keyboard 16. As best seen in FIGURE 2, the trays 12 are suspended from conveyer chains 18 by arms 20. The conveyer chains 18 engage upper and lower sprockets 22, 23, the sprocket 23 being driven with shaft 23a through a chain 24 engaging a sprocket (not shown) on shaft 23a and drive sprocket 26 mounted on shaft 26a. Shaft 26a also mounts a sprocket 27 which is engaged by a chain 28 drivingly connecting it to motor sprocket 29 fixed on the output shaft of a reversible motor 30. As will be more fully described later, the reversible motor 30 is selectively controlled by the keyboard 16 to bring a selected record tray 12 to the record retrieval location at the access opening 14 in cabinet 10. The conveyer 13 may be of the type disclosed in Reissue Patent No. 25,919, issued Nov. 30, 1965, to W. G. Anders and assigned to the assignee herein. While I have illustrated seven file trays 12 in FIGURE 2, in practice there may be seven banks or rows of individual trays as seen in FIGURE 1. It will be appreciated that any practicable number of such trays or tray rows may be retrieved by the apparatus of my invention.

Figure 6:
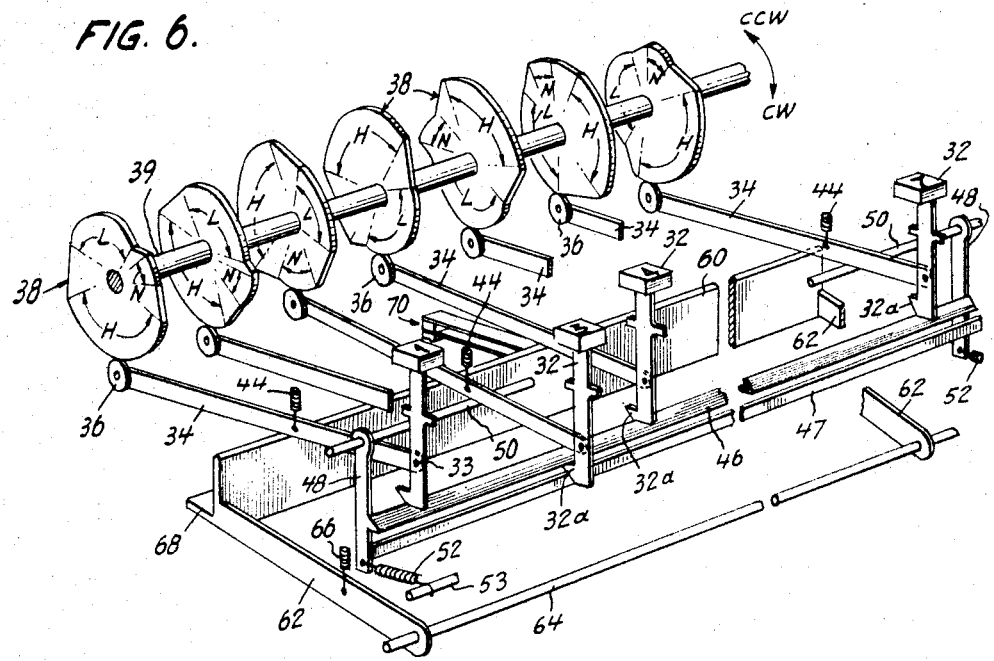
FIGURE 6 is a diagrammatic perspective view, partially broken away, showing various elements of my invention in assembly.

Referring now to FIGURE 6, several of the seven keys 32 making up keyboard 16 are shown in full while the remaining are omitted for the sake of clarity. Each key 32 is associated with a different one of the trays 12. It is assumed for the purposes of this description that the keys 32 are numbered 1 through 7, and that the trays 12 are similarly numbered as indicated in FIGURE 2. In FIGURE 6 the keys numbered 1, 3, and 7 are shown in full. Each of the keys 32 is pivotally connected at 33 to one end of a sensing lever 34, the other end of the lever carries a cam follower roller 36 which rides against the edge surface of its cam 38. Thus, each key 32 has associated with it a sensing lever 34 and a cam 38. The cams 38 are mounted on a common shaft 39. A sprocket 40 (FIGURE 2) fixed on shaft 39 is engaged by a chain 42 driven off a sprocket (not shown) fixed to sprocket shaft 26a. Thus, the reversible motor 30 drives the conveyer 13 and rotates cam-shaft 39 in synchronism therewith. The drive ratio between the sprocket shaft 26a and the camshaft 39 is such that the latter makes one complete revolution for each complete cycle of the conveyer 13. That is, each one of the trays 12 are conveyed past the access opening 14 during one revolution of the cam-shaft 39.

Figure 3:
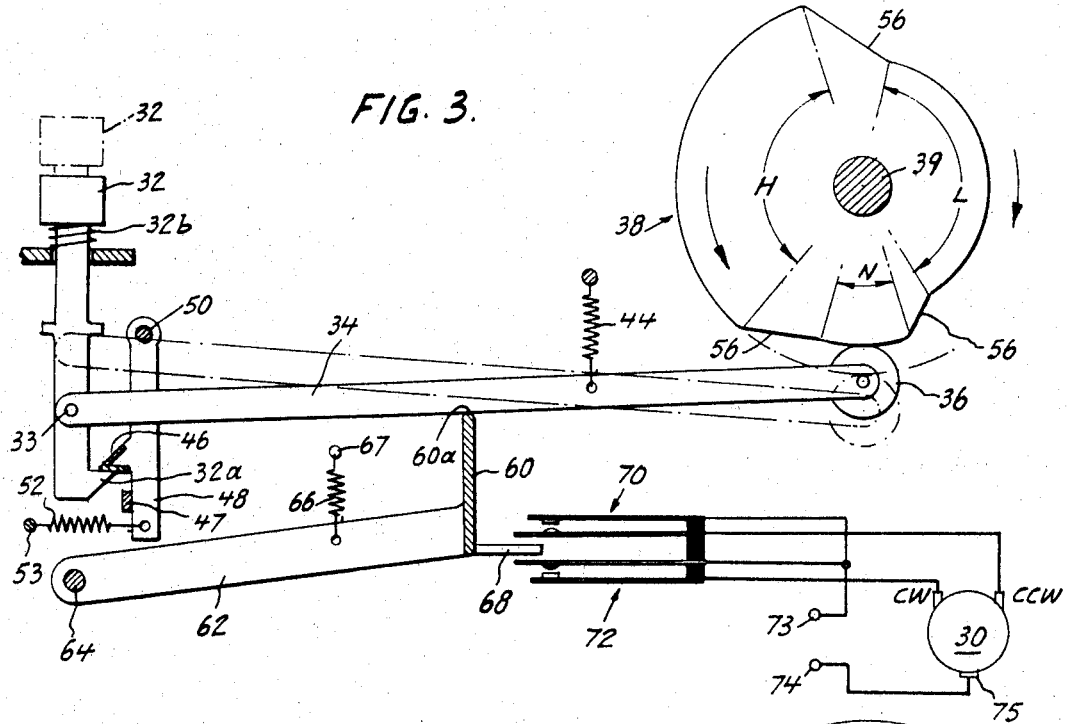
FIGURE 3 is a diagrammatic view showing the positions of various elements of my invention when a key selected file carrier has been positioned at the record retrieval location.

Returning to FIGURE 6, springs 44 pull upwardly on the sensing levers 34 to urge their rollers 36 against the edges of their respective cams 38. The lower end of each key 32 has a catch 32a for engaging an elongated catch bar 46 extending beneath each of the seven keys. The catch bar 46 is attached at its ends to links 48 pivotally mounted at their upper ends on a rod 50. Springs 52 connected between a stationary pin 53 and the lower end of lengths 48 bias the catch bar 46 against a stop bar 47, thus to be in position for engagement with catch 32a at the lower end of a depressed key 32. Thus, once a key 32 is depressed, it is held down by the catch bar 46. As a key 32 is depressed, its catch 32a pushes the catch bar 46 rearwardly, thereby releasing a previously depressed key, the keys being normally biased upwardly by a spring 32b (FIGURE 3). Therefore, during normal keyboard operation, one of the keys 32 is always in the down position, and it is released when another key is depressed; it in turn being held down by catch bar 46.

An elongated sensing bar 60, seen in FIGURES 3 through 6, extends transversely beneath each one of the sensing levers 34. The sensing bar 60 is mounted at its ends by arms 62 pivotally connected to a rod 64. Springs 66 connected between a stationary pin 67 and the arms 62 urge the sensing bar 60 upwardly causing its upper edge 60a to contact the bottom edge of any one of the sensing levers 34 at substantially its midlength. An actuator arm 68 carried by the sensing bar 60 is positioned to operate a pair of switches 70 and 72. One side of the switches 70 and 72 is connected in common to an electrical input terminal 73. A second electrical input terminal 74 is connected to terminal 75 of reversible motor 30. The other side of switch 70 is connected to terminal CCW (counterclockwise) of the motor 30 while the other side of switch 72 is connected to motor terminal CW (clockwise). Thus, with an input voltage applied across input terminals 73 and 74, closure of switch 70 causes the motor 30 to be energized to drive in the counterclockwise direction. On the other hand, if switch 72 is closed, the motor drives in the clockwise direction. Clockwise motor drive produces clockwise movement of the conveyer 13 (FIGURE 2) and clockwise rotation of camshaft 39 (FIGURE 6), and vice versa.

Figure 4:
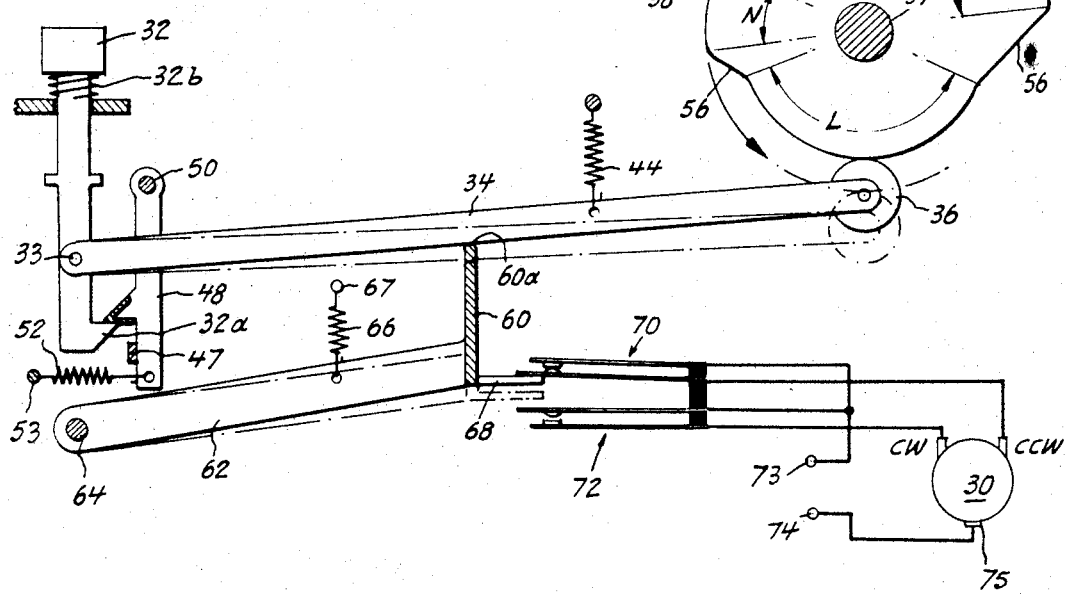
FIGURE 4 is a diagrammatic view of the positions of various elements of my invention when a selected file carrier is being translated in a first direction to the record retrieval location.
Figure 5:
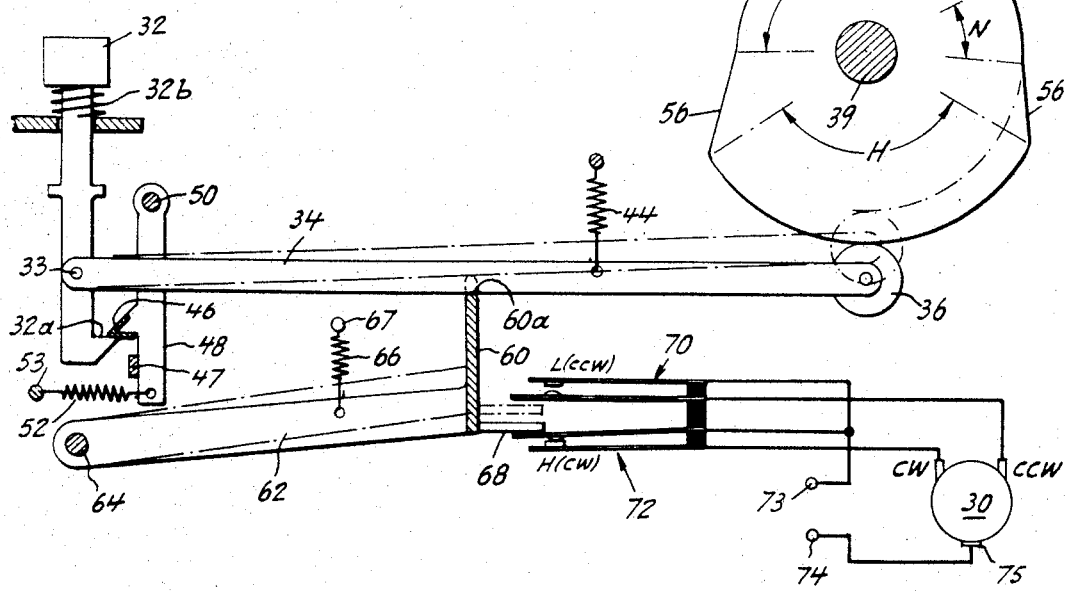
FIGURE 5 is a diagrammatic view of the positions of various elements of my invention when a selected file carrier is being translated in a second direction to the record retrieval location.

The cams 38 are all identical in configuration; each having three separate and distinct cam surfaces disposed on three different radii, as seen best in FIGURES 3 through 5. First there is a high cam surface disposed on the largest radius and included within the cam sector designated by the letter H. Then there is the cam surface disposed on the smallest radius and included within the cam sector identified with the letter L. On an intermediate cam radius is the third cam surface included in the cam sector identified by the letter N. Ramp cam surfaces 56 join the high (H), low (L), and neutral (N) cam surfaces about the cam circumference.

In the disclosed embodiment, there are seven record trays 12 requiring seven different conveyer positions in order to position each tray at the access opening 14. Each of the cams 38 is subdivided into a corresponding seven positions, three encompassed by the high (H) cam surface and three by the low (L) cam surface. The neutral (N) cam surface encompasses one position.

Referring now to FIGURES 2 through 6, the operation of switches 70 and 72 is determined by the angular orientation of the cams 38 and their associated sensing lever rollers 36. In order for one of the sensing levers 34 to be effective to engage the sensing bar 60 and thereby move the actuating arm 68 into actuating engagement with either switch 70 or 72, its associated key 32 must be depressed. As seen in FIGURE 4, if the roller 36 associated with a depressed key 32 engages the low (L) cam surface of its associated cam 38, spring 66 urges the sensing bar 60 upwardly, raising the actuating arm 68 to close switch 70. The motor 30 is energized for counterclockwise drive. On the other hand, if the roller 36 associated with a depressed key rides on the high (H) cam surface of its associated cam 38, the associated sensing lever 34 depresses the sensing bar 60, lowering the actuating arm 68 to close switch 72. The motor is thus energized for clockwise drive as seen in FIGURE 5.

As seen in FIGURE 3, when the roller 36 associated with a depressed key 32 rides on the neutral (N) cam surface of its associated cam 38, the sensing bar 60 is oriented by the associated sensing lever 34 so that the actuating arm 68 is positioned midway between switches 70 and 72. In this situation, the motor 30 is de-energized, terminating movement of the conveyer 13 and rotation of the cam shaft 39.

At this point, it is important to note that each one of the cams 38 is associated with a different one of the trays 12, and that each is mounted on shaft 39 in angular orientation according to the position of its associated tray relative to the access opening 14 of the file cabinet 10. When a file tray 12 is positioned at the access opening 14, its associated cam 38 is oriented such that its cam follower roller 36 rides on its neutral (N) cam surface.

As shown in FIGURE 4, if the roller 36 associated with a depressed key is riding on a low (L) cam surface, switch 70 is closed and the motor 30 is energized to drive the cams 38 and the conveyer 13 in a counterclockwise direction. When the roller 36 rides up on the neutral (N) cam surface of the cam 38 associated with the depressed key, the sensing bar 60 is moved downwardly by sensing lever 34 to position the actuating arm 68 midway between switches 70 and 72 (FIGURE 3 position). Switch 70 opens terminating motor drive with the tray 12 associated with the depressed key 32 positioned at the access opening 14.

As shown in FIGURE 5, if the roller 36 associated with the depressed key is riding on a high (H) cam surface, switch 72 is closed and motor 30 is energized for clockwise drive. The conveyer 13 is driven clockwise and the camshaft 39 is rotated clockwise until the roller 36 associated with the depressed key rides down on the neutral (N) cam surface of the associated cam 38, whereupon switch 72 opens as actuating arm 58 moves upwardly to mid-position (FIGURE 3 position). The conveyer 13 is stopped with the file tray 12 associated with the depressed key 32 positioned at the access opening 14.

As previously noted, upon depression of a key 32, a previously depressed key is released and the key being depressed is held down by catch bar 46. The position of the sensing bar 60 and its switch actuating arm 68 thus comes under the exclusive control of the sensing lever 34 associated with the depressed key 32; the mid-length point of all other sensing levers 34 being positioned above the mid-length point of the depressed sensing lever regardless of which cam surface their rollers 36 are riding on. In practice, the typical situation is that the roller 36 associated with a previously depressed key 32 is riding on the neutral (N) cam surface of its associated cam 38. Thus, the switch actuating arm 68 is in its mid-position; the desired retrieval function designated by the depressed key having been fulfilled. When another key 32 is depressed, the previously depressed key is released thereby permitting the positioning of the switch actuating arm 68 to come under the exclusive control of the cam 38 associated with the newly depressed key.

The over-all operation of the apparatus of my invention will now be described with reference to FIGURES 2 and 6. The positions of the various elements in FIGURE 6 is consistent with the position of the number 3 tray at the access opening 14, as seen in FIGURE 2. That is, the number 3 key is depressed and held down by catch bar 46. The associated cam follower roller 36 bears against the neutral (N) cam surface of its associated cam 38. Both switches 70 and 72 are open and the apparatus is at rest. Now if the number 4 key is depressed for example, the number 3 key is released and the number 4 cam assumes control of switches 70 and 72. As seen in FIGURE 6, the roller 36 associated with the number 4 cam bears against the low (L) cam surface. Referring to FIGURE 6, it is seen that switch 70 (FIGURE 4) is closed in this situation to energize the motor 30 for counterclockwise drive. When the camshaft 39 is rotated 1/7 of a full revolution in the counterclockwise direction, the roller 36 associated with the depressed number 4 key will then be contacting the neutral (N) cam surface of the number 4 cam 38. This corresponds to the next position of the conveyer and it is seen in FIGURE 2 that when the conveyer moves one position in the counterclockwise direction, the number 4 tray is positioned at the access opening 14.

Similarly, if instead of the number 4 key, the number 7 key were depressed to release the number 3 key the conveyer would move three positions in the clockwise direction to present the number 7 tray at the access opening 14, and so on. It is thus seen that regardless of the conveyer position and which one of the keys 32 is depressed, the maximum conveyer movement necessary to position the appropriate tray 12 at the access opening 14 is three positions in the illustrated embodiment. The conveyer 13 therefore brings the selected tray 12 to and stops it at the access opening 14 automatically in the shortest possible time and over the shortest route. The cam 38 associated with the depressed key 32, in effect, tells the conveyer 13 in what direction to move and when to stop in order to position the selected tray 12 at the access opening 14. If the conveyer moved only in one direction, certain retrieval situations would require the conveyer to move through substantially a complete cycle in order to fulfill the desired retrieval function.

It is seen in the illustrated embodiment that each cam 38 has seven angular positions separated by 360/7 degrees. Three of these cam positions are on the high (H) cam surface and three more are on the low (L) cam surface. The seventh position is designated by the neutral (N) cam surface. To expand the capacity of my positioning apparatus, each cam 38 is subdivided into N positions where N equals the number of trays 12 or rows of trays to be handled. In this situation, there will be N cams 38, and N keys 32 interconnected by individual sensing levers 34 and rollers 36. Regardless of the number N, there will be only one sensing bar 60 and two switches 70 and 72 required. Of the N cam positions on each cam 38, one will be on a neutral (N) cam surface, one-half of the remaining cam positions will be on a high (H) cam surface, and the other half on a low (L) cam surface. Where N is an even number, either the high (H) or the low (L) cam surface will have one more cam position than the other. The N cams 38 are mounted on a common shaft 39 rotating in synchronism with movement of the conveyer; each cam being angularly oriented in accordance with the position at any time of its associated tray 12 relative to the access opening 14. In this manner, the cams 38 serve as individual memories storing information as to the location of its associated tray 12 relative to the access opening 14. Each cam by its high (H) and low (L) cam surfaces, controls the conveyer direction and the number of positions it should move in order to position its associated tray 12 at the access opening in the shortest time.

It will be appreciated that, although the conveyer 13 disclosed herein is a closed loop system, my invention is also adaptable to a straight line conveyer system capable of bidirectional rectilinear movement in positioning a selected one of a plurality of articles at a single, fixed location. In this situation, the cams need not be annular and may take the form of a linear cam capable of bidirectional, rectilinear movement in synchronism with the conveyer. It will be appreciated that for any conveyer movement, a variety of cam shapes and types may be employed such as barrel or belt cams; each cam having the requisite three distinctively different cam surfaces. It is understood that electrical or mechanical detenting means may be employed in combination with my invention to provide more precise positioning of the selected tray 12 at the access opening 14. Various other forms of mechanical cam follower mechanisms may be employed to translate the angular orientation of the cam associated with the actuated key 32 into selective operation of either switch 70 or switch 72. If desired, relays may be employed to amplify the electrical switching function of switches 70, 72. Moreover, it is considered within the purview of my invention that the electrical switches 70, 72 may be replaced with other forms of switching means such as fluidic valves controlling hydraulic or pneumatic power sources.

It will be appreciated that the principles and teachings of my invention are also applicable to controlling a positioning mechanism to position itself or a single article at any selected one of a plurality of locations. In this situation, the cams and keys would be associated with different ones of the various locations at which the positioning mechanism may position itself; the cam of a selected location serving to relate its location relative to the position of the positioning means.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. Positioning apparatus for mechanized file systems wherein a selected one of a plurality of file carriers is moved by a conveyer into position at a file retrieval location; said apparatus comprising, in combination:
   (A) a keyboard having a plurality of keys, one associated with each carrier;
   (B) a plurality of cams, one associated with each carrier,
      (1) said cams being driven in syncronism with movement of the conveyer,
      (2) each said cam having plural, distinctly different cam surfaces joined in series serving to locate its associated carrier relative to the file retrieval location;
   (C) plural cam followers, one following said cam surfaces of each cam and mechanically connected to a different one of said keys; and
   (D) switching means producing selected directional movement of the conveyer,
      (1) said switching means being selectively actuated by the one of said cam followers connected to an actuated key as said one cam follower follows said cam surfaces during movement thereof in synchronism with the conveyer;
   whereby the carrier associated with the actuated key is conveyed to and stopped at the file retrieval location by the shortest route and in the shortest possible time.

2. The positioning apparatus defined in claim 1 wherein said switching means has first, second and third switching conditions, and each said cam has first, second and third different cam surfaces;
   (1) said first condition producing conveyor movement in one direction,
   (2) said second condition producing conveyor movement in an opposite direction, and
   (3) said third condition terminating conveyor movement,
   (4) said switching means being actuated to said first, second or third switch conditions by said one cam follower in following said first, second or third cam surfaces, respectively.

3. The apparatus defined in claim 2 wherein each said cam is in the form of a disk,
   (1) said first, second and third cam surface being disposed on different radii about the circumference of said disk.

4. The apparatus defined in claim 3 wherein there are N carriers moved by the conveyor and each said disk having
   (1) N positions on said cam surfaces separated by 360/N degrees,
      (a) one of said positions being at said third cam surface,
      (b) the remaining positions being divided substantially equally between said first and second cam surfaces.

5. The apparatus defined in claim 1 wherein each said cam follower is in the form of a sensing lever pivotally connected at one end to a different one of said keys, the other end of each said sensing lever carrying a roller riding against the cam surfaces of a different one of said cams.

6. The apparatus defined in claim 1 which further includes
   (E) an elongated sensing bar extending transversely to each of said cam followers, said sensing bar
      (1) being positioned exclusively by the one of said cam followers connected to an actuated key to thereby in turn selectively actuate said switching means.

7. The apparatus defined in claim 1 which further includes
   (E) means operating to retain an actuated key in its actuated position and concurrently to release a previously actuated key from its actuated position.

8. The apparatus defined in claim 1 wherein each said cam follower is in the form of a sensing lever pivotally connected at one end to a different one of said keys, the other end of each said sensing lever carrying a roller riding against the cam surfaces of a different one of said cams, said apparatus further comprisig
   (E) an elongated sensng bar extending transversely to said cam followers, said sensing bar
      (1) being positioned exclusively by the one of said sensing levers connected to an actuated key to thereby in turn selectively actuate said switching means; and
   (F) means for retaining an actuated key in its actuated position and concurrently releasing a previously actuated key from its actuated position.

9. The apparatus defined in claim 8 wherein said sensing bar is located relative to said sensing levers such as to be positioned in response to engagement with said one sensing lever at a point located substantially at its midlength,
   (1) said remaining sensing levers being positioned by said remaining unactuated keys in spaced relation to said sensing bar.

10. The apparatus defined in claim 1 wherein
   (1) said cams are mounted on a common shaft rotated in synchronism with movement of the conveyor
      (a) said shaft making one full revolution for each complete cycle of the conveyor,
      (b) said cams being angularly oriented on said shaft according to the positions of their associated carriers relative to the retrieval location.

11. Positioning apparatus comprising, in combination:
   (A) a positioning mechanism capable of bidirectional movement to any one of a plurality of positions;
   (B) a separate key associated with each said mechanism position and actuated to select its associated mechanism position;
   (C) a plurality of cams moving in synchronism with said positioning mechanism,
      (1) one of said cams associated with each said mechanism position,
      (2) each cam having plural distinctively different cam surfaces relating the present position of said positioning mechanism to the mechanism position associated therewith;
   (D) a cam follower mechanically interconnecting the key and cam associated with the same mechanism position; and
   (E) switching means controlled by the one of said cam followers connected to an actuated key for
      (1) conditioning the movement of said positioning mechanism in the direction of shortest distance to position it at the position selected by said actuated key in the shortest time.

12. The apparatus defined in claim 11 wherein said positioning mechanism carries a plurality of articles, each position of said positioning mechanism effective to dispose a different one of said articles at a predetermined location.

References Cited

UNITED STATES PATENTS

| | | | |
|---|---|---|---|
| 1,870,410 | 8/1932 | Higber | 318—467 X |
| 3,141,123 | 7/1964 | Olson | 312—268 X |
| 3,142,009 | 7/1964 | Novak | 318—467 X |
| 3,235,319 | 2/1966 | Anders et al. | 312—223 |
| 3,297,379 | 1/1967 | Artaud et al. | 312—223 |
| 3,345,117 | 10/1967 | Goldammer | 312—223 |

CASIMIR A. NUNBERG, *Primary Examiner.*

U.S. Cl. X.R.

318—467; 312—267